US012558669B1

(12) United States Patent
Chan

(10) Patent No.: US 12,558,669 B1
(45) Date of Patent: Feb. 24, 2026

(54) SORBENT AND METHOD FOR CARBON DIOXIDE CAPTURE AND RECOVERY

(71) Applicant: METASORBEX CORPORATION, Mt. Juliet, TN (US)

(72) Inventor: Edward M. Chan, Loveland, OH (US)

(73) Assignee: Metasorbex Corporation, Mt. Juliet, TN (US)

( * ) Notice: Subject to any disclaimer, the term of this patent is extended or adjusted under 35 U.S.C. 154(b) by 0 days.

(21) Appl. No.: 18/744,741

(22) Filed: Jun. 17, 2024

Related U.S. Application Data

(60) Provisional application No. 63/521,494, filed on Jun. 16, 2023.

(51) Int. Cl.
   *B01J 20/20* (2006.01)
   *B01D 53/62* (2006.01)
   (Continued)

(52) U.S. Cl.
   CPC .............. *B01J 20/20* (2013.01); *B01D 53/62* (2013.01); *B01D 53/82* (2013.01); *B01J 20/24* (2013.01);
   (Continued)

(58) Field of Classification Search
   CPC .. B01J 20/20; B01J 20/2803; B01J 20/28042; B01J 20/24; B01J 20/3483;
   (Continued)

(56) References Cited

U.S. PATENT DOCUMENTS

| | | |
|---|---|---|
| 5,876,488 A | 3/1999 | Birbara et al. |
| 6,547,854 B1 | 4/2003 | Gray et al. |

(Continued)

FOREIGN PATENT DOCUMENTS

| CA | 2244187 | * | 3/2000 | ............... B01J 2/00 |
| CN | 107253715 A | * | 10/2017 | ............. B01J 20/00 |

(Continued)

OTHER PUBLICATIONS

Jieli Jin, Zhengcheng Wen, Shengqi Li, and Ju Huang, "Quantun chemical study of CO2 physisorption and chemisorption on EDA-grafted graphene oxide", Greenhouse. Gas. Sci. Technol. 13:357-368.*

(Continued)

*Primary Examiner* — Wayne A Langel
(74) *Attorney, Agent, or Firm* — Daniel F. Nesbitt; Nesbitt IP LLC

(57) ABSTRACT

A functionalized carbon dioxide sorbent of a functionalized graphene oxide (fGO) substrate having substitution sites substituted with a functional group. The functional groups can be secondary or tertiary amines, a phosphate, a sulfonate or magnetite. The sorbent can have a binder intermixed with the fGO substrate, in the form of pellets, using a hydroxy-ethyl cellulose binder. A method using the functionalized sorbent provided captures a $CO_2$ from a flue gas, by passing the flue gas containing moisture and a concentration of $CO_2$ across the sorbent packed bed of the functionalized sorbent to adsorb selectively a portion of $CO_2$ in the flue gas onto the fGO of the sorbent. The captured $CO_2$ can be desorbed from the sorbent by exposure to a fluid at elevated temperature and/or reduced pressure conditions sufficient to desorb the $CO_2$, and separating and concentrating the desorbed $CO_2$ from the fluid. The functional moieties can be at least one of a primary and secondary amine, and a secondary function group of tertiary amines, phosphates, sulfonates and/or magnetite.

18 Claims, 4 Drawing Sheets

(51) Int. Cl.

| | | |
|---|---|---|
| *B01D 53/82* | (2006.01) | |
| *B01J 20/24* | (2006.01) | |
| *B01J 20/28* | (2006.01) | |
| *B01J 20/30* | (2006.01) | |
| *B01J 20/32* | (2006.01) | |
| *B01J 20/34* | (2006.01) | |

(52) U.S. Cl.
CPC ..... *B01J 20/2803* (2013.01); *B01J 20/28042* (2013.01); *B01J 20/3042* (2013.01); *B01J 20/3204* (2013.01); *B01J 20/3242* (2013.01); *B01J 20/3416* (2013.01); *B01J 20/3483* (2013.01); *B01D 2253/102* (2013.01); *B01D 2253/25* (2013.01); *B01D 2257/504* (2013.01); *B01D 2258/0283* (2013.01)

(58) Field of Classification Search
CPC ................ B01J 20/3204; B01J 20/3242; B01J 20/3042; B01D 53/62; B01D 53/82
See application file for complete search history.

(56) References Cited

U.S. PATENT DOCUMENTS

| | | | |
|---|---|---|---|
| 7,795,175 | B2 | 9/2010 | Olah et al. |
| 8,567,133 | B2 | 10/2013 | Ahmed et al. |
| 9,156,701 | B2 | 10/2015 | Ho et al. |
| 9,670,237 | B2 | 6/2017 | Dai et al. |
| 9,833,749 | B2 | 12/2017 | Park et al. |
| 10,029,215 | B2 | 7/2018 | Park et al. |
| 10,865,502 | B2 | 12/2020 | Zhamu et al. |
| 11,015,128 | B1 * | 5/2021 | Zoican-Loebick .......................... B01J 20/28033 |
| 11,731,923 | B1 * | 8/2023 | Chen .................. B01D 19/0057 518/700 |
| 12,447,436 | B2 * | 10/2025 | Ho ......................... B01D 71/48 |
| 2008/0087165 | A1 | 4/2008 | Wright et al. |
| 2015/0210558 | A1 | 7/2015 | Dickinson et al. |
| 2016/0074814 | A1 | 3/2016 | Park et al. |
| 2017/0266639 | A1 | 9/2017 | Sadek |
| 2018/0036713 | A1 | 2/2018 | Li et al. |
| 2018/0065105 | A1 * | 3/2018 | Song .................. B01D 69/1214 |
| 2020/0147558 | A1 | 5/2020 | Yu et al. |
| 2020/0376445 | A1 | 12/2020 | Ahn et al. |
| 2021/0023508 | A1 | 1/2021 | Agrawal et al. |
| 2021/0236983 | A1 * | 8/2021 | Junaedi ................ B01J 20/3458 |
| 2021/0394127 | A1 | 12/2021 | Ho et al. |
| 2022/0017720 | A1 | 1/2022 | Akhlaghi et al. |
| 2022/0212958 | A1 | 7/2022 | Coumont |
| 2023/0264138 | A1 | 8/2023 | McGrail et al. |

FOREIGN PATENT DOCUMENTS

| | | | | | |
|---|---|---|---|---|---|
| CN | 108212100 | A | * | 6/2018 | .............. B01J 20/20 |
| CN | 110180514 | A | * | 8/2019 | .............. B01J 20/20 |
| EP | 0585928 | A1 | * | 3/1994 | .............. A01K 1/015 |
| EP | 3539644 | A1 | | 9/2019 | |
| KR | 20180038531 | A | * | 4/2018 | .............. B01D 53/46 |
| KR | 102032387 | B1 | * | 10/2019 | .............. B01D 53/14 |
| WO | 2013006318 | A1 | | 1/2013 | |
| WO | 2013138698 | A1 | | 9/2013 | |
| WO | 2019161114 | A1 | | 8/2019 | |
| WO | 2020011892 | A1 | | 1/2020 | |
| WO | WO 2020/150838 | A1 | * | 7/2020 | .............. B01D 53/14 |
| WO | 2021239747 | A1 | | 12/2021 | |
| WO | WO-2023028652 | A1 | * | 3/2023 | .............. B01D 53/02 |

OTHER PUBLICATIONS

Yamin Liu et al., "Ultrasound-assisted amine functionalized graphene oxide for enhanced CO2 adsorption", Fuel 247 Oct. 18, 2019.*

Dong-Hui Lan et al., "One-pot synthesized multi-functional graphene oxide as a water-tolerant and efficient metal-free heterogeneous catalyst for cycloaddition reaction", Carbon 93 (2015) 22-31.*
Zhengcheng Wen et al., "A Theoretical Mechanism Study on the Ethylenediamine Grafting on Graphene Oxides for CO2 Capture", Arabian Journal for Science and Engineering (2018) 43:5949-5955.*
Sartori et al., "Sterically Hindered Amines for C02 Removal from Gases", May 1983, Ind. Eng. Chem. Fundam., vol. 22 No. 2, p. 239-249 (11 pages).
Gray et al., "Improved immobilized carbon dioxide capture sorbents", Oct. 2005, Fuel Processing Technology vol. 86 No. 14-15, p. 1449-1455 (7 pages).
Puxty et al., "Carbon Dioxide Postcombustion Capture: A Novel Screening Study of the Carbon Dioxide Absorption Performance of 76 Amines", Jul. 17, 2009, Environ. Sci. Technol. vol. 43 No. 16, p. 6427-6433 (7 pages).
Mishra et al., "Nanostructured polyaniline decorated graphene sheets for reversible CO2 capture", Jan. 25, 2012, J. Mater. Chem., vol. 22, No. 9, . 3708-3712 (5 pages).
Fernandes et al., "Investigations of primary and secondary amine carbamate stability by 1H NMR spectroscopy for post combustion capture of carbon dioxide", Apr. 5, 2012, J. Chem. Thermodynamics vol. 54, p. 183-191 (9 pages).
Didas et al., "Role of Amine Structure on Carbon Dioxide Adsorption from Ultradilute Gas Streams such as Ambient Air", Jul. 4, 2012, ChemSusChem vol. 5 No. 10, p. 2058-2064 (7 pages).
Li et al., "Advances in CO2 capture technology: A patent review", Oct. 6, 2012, Applied Energy vol. 102, p. 1439-1447 (9 pages).
Perinu et al., "NMR spectroscopy applied to amine-CO2—H2O systems relevant for post-combustion CO2 capture: A review", Dec. 5, 2013, Int. J. Greenhouse Gas Control vol. 20, p. 230-243 (pre-print proof, 15 pages).
Ibrahim et al., "Effects of piperazine on carbon dioxide removal from natural gas using aqueous methyl diethanol amine", Nov. 2014, J. Nat. Gas Sci. and Eng. vol. 21, p. 894-899 (6 pages).
Li et al., "Efficient CO2 capture by functionalized graphene oxide nanosheets as fillers to fabricate multi-permselective mixed matrix membranes", Feb. 16, 2015, ACS Appl. Mater. Interfaces vol. 7 No. 9, p. 5528-5537 (pre-print proof, 40 pages).
Aloba, "Carbon Dioxide Capture by Functionalized Graphene Oxide Adsorbent", May 2015, University of Mississippi Sally McDonnell Barksdale Honors College, Honors Thesis, 878, https://egrove. olemiss.edu/hon_thesis/878 (40 pages).
Zhai et al., "The Nature of Adsorbed Carbon Dioxide on Immobilized Amines during Carbon Dioxide Capture from Air and Simulated Flue Gas", Nov. 12, 2016, Energy Technol. vol. 5 No. 3, p. 510-519 (pre-print proof, 16 pages).
Bos et al., "Evaluating Regeneration Options of Solid Amine Sorbent for CO2 Removal", Aug. 1, 2018, Ind. Eng. Chem. Res. vol. 57, p. 11141-11153 (13 pages).
Liu et al., "Ultrasound-assisted amine functionalized graphene oxide for enhanced CO2 adsorption", Jul. 1, 2019, Fuel vol. 247, p. 10-18 (9 pages).
Luong et al., "Gram-scale bottom-up flash graphene synthesis", Jan. 27, 2020, Nature, vol. 577, p. 647-651 (7 pages).
Yu et al., "Progress in the functional modification of graphene/ graphene oxide: a review", Apr. 17, 2020, RSC Advances vol. 10, p. 15328-15345 (18 pages).
Meconi et al., "Adsorption-induced clustering of CO2 on graphene", Aug. 12, 2020, Phys. Chem. Chem. Phys. vol. 22, p. 21031-21041 (pre-publication manuscript, 35 pages).
Cong et al., "Characteristics and electrochemical performances of silicon/carbon nanofiber/graphene composite films as anode materials for binder-free lithium-ion batteries", Jan. 14, 2021, Sci. Reports vol. 11 No. 1283 (11 pages).
Huang et al., "Millisecond lattice gasification for high-density CO2- and O2-sieving nanopores in single-layer graphene", Feb. 24, 2021, Sci. Adv. vol. 7, eabf0116 (12 pages).
"Direct Air Capture Technology", 1PointFive, https://www.1pointfive. com/dac-technology, Mar. 26, 2022 according to Wayback Machine (4 pages).

* cited by examiner

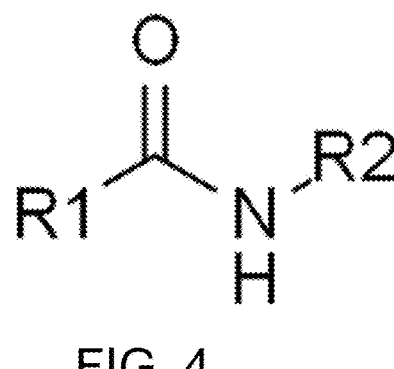
FIG. 4
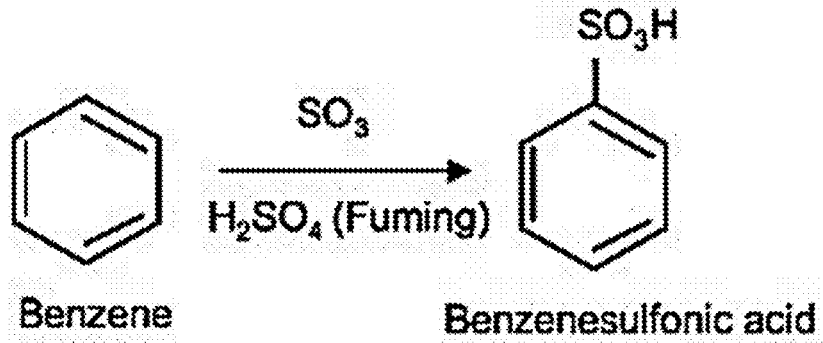
FIG. 5(a)
FIG. 5(b)
FIG. 5(c)

$$[CO_2(T)] \propto e^{\frac{-\Delta H}{RT}}$$

FIG. 5(f)

SORBENT AND METHOD FOR CARBON DIOXIDE CAPTURE AND RECOVERY

CROSS-REFERENCE TO RELATED APPLICATIONS

This application claims the benefit of U.S. Provisional Application No. 63/521,494 filed on Jun. 16, 2023, which is incorporated herein by reference in its entirety.

FIELD OF THE INVENTION

The present invention pertains generally to the field of gas separation filters, especially useful to the capture of carbon dioxide from a flue gas.

BACKGROUND OF THE INVENTION

The global carbon dioxide ($CO_2$) emissions have risen rapidly in the last decade. One can think of climate change as a simple chemical reactor with earth as the control volume, in terms of mass and energy balance. Energy consumption parallels global GDP or population, and is a monotonic, increasing function over time. Carbon and non-carbon sources (renewables) are relied upon to produce energy. Gas emissions from carbon-based fuels lead to a positive balance of carbon mass. Carbon sink (negative) offsets the emissions. On a global basis, 42 giga (G) tons/yr of $CO_2$-equivalent is emitted. Oceans and trees provide a carbon reduction of 12 G tons/yr, resulting in a continual accumulation of $CO_2$ in the atmosphere. In 2019, NASA measured the atmospheric [$CO_2$] at 412 ppm. This is equivalent to $2.12 \times 10^{12}$ tons $CO_2$. Per IPCC, an additional 0.57 trillion tons $CO_2$, (for example, carbon budget), will push earth over the tipping point, defined as when climate change is considered irreversible. This threshold was derived from a 1.5 degrees C. global mean temperature increase over the preindustrial age. At the present trajectory, the global mean temperature rise has been 1.0 degrees C. from 1900 and the rate of increase is +0.2 degrees C./decade. Therefore, there is roughly 5 decades to bend the curve on carbon accumulation on a global basis.

To affect climate change, both carbon emission reduction and carbon negative strategies must be implemented simultaneously to ensure there is no overshoot. The boundary conditions of the solutions are necessarily global, retrofittable, carbon-circular, geoscale and economic rational. The first priority is to reduce and reuse carbon in targeted industries, to slow the rate of temperature rise and afford time to discover and commercialize geoscale carbon negative solutions.

Incumbent carbon capture technologies do not provide economical solutions to end users. They require both high capital expenditure relative to manufacturing plant assets and high operational expenses. Second, carbon-circular economy under the existing technology set is hard to achieve, which does not return carbon back to the geosphere, other than storage as $CO_2$ in depleted oil and gas reservoirs or saline aquifers. As storage areas begin to encroach into human habitats, one can anticipate a "Not in My Backyard" (NIMBY) push-back from citizens. Third, current solutions are not portable to different industry verticals. For example, it is hard to imagine a solvent scrubber in a cement factory to be applicable in the transportation sector. Installation of an acre-size solvent scrubber on an internal combustion engine vehicle is not practical.

The short- to medium-term solutions to limit the increase of $CO_2$ concentration in the atmosphere include $CO_2$ capture, utilization and sequestration (CCUS). To reduce the energy-penalty of capture, which is currently prohibitively high, the development of an energy-efficient carbon capture route is vital to control $CO_2$ emissions. Membrane-based $CO_2$ separation is one of most promising and energy-efficient solution because membranes do not rely on the expensive thermal energy.

As described herein, the existing technologies for carbon capture for flue gas emissions are capital and operationally intense. The solution offered by the present invention offers three components, which are designed for low capital expenditure (capex) and operating expense (opex): (1) advanced materials design, (2) continuous operation process design, and carbon-circular schema to reuse $CO_2$ and repurpose spent active-material in end of life applications.

SUMMARY OF THE INVENTION

The present invention provides an efficient and selective gas filter using a graphene oxide powder selectively separating and capturing $CO_2$ gas from other gas components in a gas stream, including from a flue gas.

The present invention also provides an efficient and selective gas filter having stable gas separation performance over multiple separation cycles, in particular over multiple cycles of heating and cooling.

The present invention further provides an efficient and selective gas filter having stable gas separation performance over multiple separation cycles.

In various embodiments, a functionalized carbon dioxide sorbent of the invention comprises a functionalized graphene oxide substrate having a plurality of substitution sites substituted with a functional group, wherein the plurality of functional groups include at least one of a primary amine and a secondary amine, and a secondary functional group selected from the group consisting of a secondary amine, a tertiary amine, a phosphate, a sulfonate, a nitrile, a hydroxyl, and magnetite ($Fe_3O_4$). These groups can be generalized to basic groups, organic or inorganic, to attract the electrophilic tendency of the carbon in $CO_2$.

In various embodiments, the weight range of oxygen in the graphene oxide is from 5% to 50%, preferably about 20% to about 40%.

In some embodiments, the sorbent further comprises a binder intermixed with the functionalized graphene substrate.

In some embodiments, the sorbent is in the form of pellets.

In some embodiments, the binder comprises hydroxyethyl cellulose.

In various embodiments, a method of the invention is provided for capturing selectively carbon dioxide from a flue stream. The method comprising the steps of: a) providing a packed bed of an sorbent comprising functionalized graphene oxide (fGO) comprising a functional group selected from the group consisting of a secondary amine, a tertiary amine, a phosphate, and a sulfonate, and magnetite; b) passing a flue gas containing moisture and a concentration of carbon dioxide ($CO_2$) across the sorbent; and c) adsorbing selectively a portion of $CO_2$ in the flue gas onto the fGO of the sorbent to reduce the concentration of the $CO_2$ content of the flue gas, and generating a partially-saturated sorbent comprising adsorbed $CO_2$.

In various embodiments, for releasing the captured carbon dioxide, the method further includes the steps of: d) exposing the partially-saturated sorbent to a fluid at conditions of temperature and pressure sufficient, to desorb the adsorbed $CO_2$ from the partially-saturated sorbent into the fluid; and e) separating and concentrating the desorbed $CO_2$ from the fluid.

In some embodiments, the functionalized graphene oxide comprises a graphene oxide structure comprising one or more functional moieties selected from the group consisting of a secondary amine, a tertiary amine, a phosphate, and a sulfonate. The weight range of oxygen in GO is from 5% to 50%, preferably about 20% to about 40%.

In some embodiments, the flue gas containing a concentration of carbon dioxide ($CO_2$) is introduced into the packed bed of the sorbent at a temperature of about 40-80° C., typically at about 60° C.

In some embodiments, the temperature of the fluid exposed to the partially-saturated sorbent is about 70-125° C., including about 110° C., or about 80° C., to at least partially desorb $CO_2$ from the partially-saturated sorbent.

In some embodiments, the method further includes a step of exposing the partially-desorbed sorbent to a vacuum to extract a further portion of $CO_2$ remaining on the sorbent, the vacuum preferably of about 0.1 bar or less.

BRIEF DESCRIPTION OF THE DRAWINGS

FIG. 4 illustrates the chemical structure of a secondary amine.

FIG. 5 illustrates various reactions, including (a) a reaction adding a nitrate to an aromatic ring via sulfuric acid; (b) a reaction adding a nitrile group to the ketone functional group in GO; (c) a reaction adding a sulfur to graphine oxide via sulfonation; (d) a phosphorylation reaction in which phosphoric acid reacts with a hydroxyl group; (e) the electronic density and the electrophilic carbon of $CO_2$; and (f) the Arrhenius equation by which an sorbate-sorbent interaction follows.

DETAILED DESCRIPTION OF THE INVENTION

Background on Graphene Oxide.

Figures 1, 2:
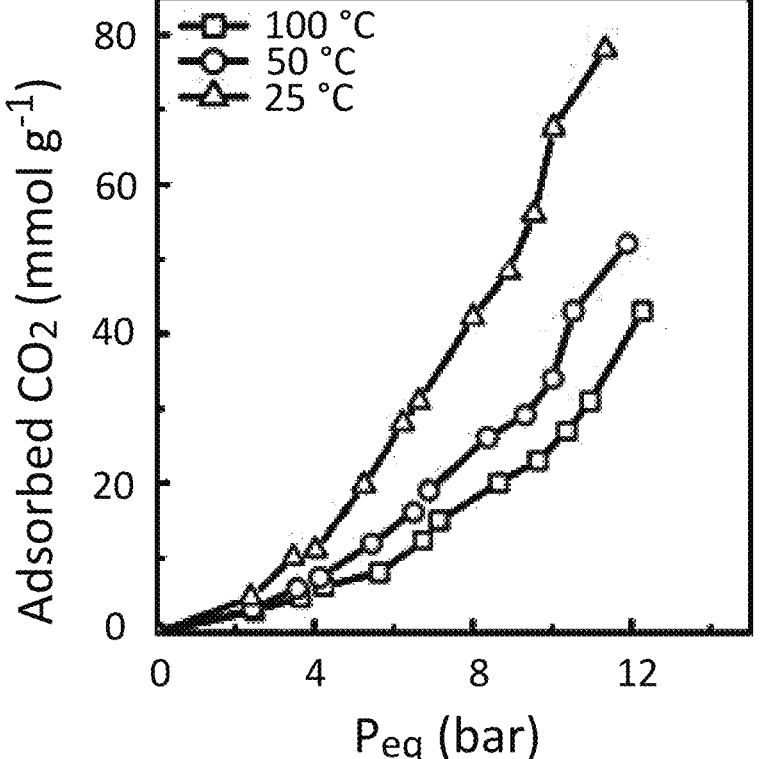
FIG. 1 illustrates the chemical structures of graphene oxide (GO).
FIG. 2 illustrates the molar adsorption of $CO_2$ on polyaniline-functionalized graphene oxide.

The rationale for selecting graphene oxide (GO) as a start material is its chemical structure, shown in FIG. 1. GO can have three substitution groups at specific locations, with ether (C—O—C) and hydroxyl (C—OH) groups on the basal plane and carboxyl groups (COOH) on the edges. Each functional group has a different rate of reactivity, which gives a degree of freedom to functionalize GO based on the strength of nucleophilic groups, for example, an amine, a sulfonate, a phosphate, and magnetite. These nucleophilic functional groups are selected due to their common usage in the specialty chemical industry, which can reduce the cost of the sorbent.

Advanced Materials Design.

A solid sorbent is used for carbon capture. By functionalizing graphene, specific gas species can be designed for adsorption over other gas species; that is, the functionalized graphene has high gas selectivity. In addition to high gas selectivity, the functionalizing of the GO material can be designed for rapid kinetics during adsorption of carbon dioxide, and low energy desorption of the captured carbon dioxide from the GO substrate and are selected to minimize operational costs.

Process Design.

The present invention provides a carbon-capture system that can be retrofitted to the flue gas emission facilities. This "end of pipe" deployment of carbon capture at post combustion affords minimal disruption in retrofitting the technology and requires the least amount of capex. In some embodiment, continuous operation is effected through a rotational carousel or packed bed system. An online and calibrated gas sensor provides feedback control to detect threshold $CO_2$ concentrations. Capture cartridges are staged into the carousel and rotated into and out of operation positioning into the capture system. Once the $CO_2$ threshold of the processed is exceeded, the cartridge is designated to be saturated. The saturated cartridge can be rotated out of, and a fresh cartridge is rotated into, the capture system. The saturated cartridge can be dismounted and a new or refreshed cartridge inserted into the carousel. To minimize design, project engineering, maintenance costs and wide serviceability, currently-available Commercially-Off-The-Shelf (COTS) components and systems are used.

Carbon-Circular

The gases selectively adsorbed into the saturated cartridges have high purity. The invention includes a process and system for desorption of the captured gases from the cartridge and volatilizing the released gases using mild heat, and condensing the volatilized gas for reuse and resale in enhanced oil recovery, refrigerant, supercritical solvent, or food and beverages markets. Once the captured $CO_2$ on the cartridges have been desorbed, the refreshed cartridge can be returned to the capture system.

Typically, the saturated cartridge comprising the fGO saturated with $CO_2$ is heated to a temperature of 60-120 degrees C. to shift the equilibrium of the process to release the captured $CO_2$, and capture and condense the released gas into liquid form.

Once a functionalized GO has exceeded its regeneration cycle, the exhausted functionalized GO can be recovered and reprocessed (thermolysis) back to a graphene oxide that can be redeployed in cement production for cement strengthening, completing the lifecycle of returning carbon to the geosphere.

Experiments

The present invention provides a Direct Air Capture (DAC) technology or point-source carbon capture by utilizing a solid sorbent for capturing $CO_2$, and using low-grade waste heat and/or low temperature to desorb the captured carbon and regenerate the sorbent, leveraging the excellent thermal conductivity of graphene, graphene oxide and reduced graphene oxide. Due to high electrical conductivity of graphene, highly efficient desorption can also be achieved through facile ultra-short time scale joule heating (see D. X. Luong, K. V. Bets, W. A. Algozeeb, M. G. Stanford, C. Kittrell, W. Y. Chen, R. V. Salvatierra, M. Q Ren, E. A. McHugh, P. A. Advincula, Z. Wang, M. Bhatt, H. Guo, V. Mancevski, R. Shahsavari, B. I. Yakobson, & J. M. Tour, "Gram-scale bottom-up flash graphene synthesis", Nature, Jan. 27, 2020, the disclosure of which is incorporated by reference in its entirety) using solar-derived low-carbon electricity.

In preferred embodiments of the carbon capture-desorption system, the techno-economic parameters are designed to provide $CO_2$ desorption requirements of 0.96 GJ/ton at 60° C. Operationally, avoidance of fines in packed beds is important for continuous and safe operations. The powder form of functionalized graphene oxide will be extruded (<140° C.) to form pellets using hydroxyethyl cellulose as a binder. The length of pellets is targeted to be about 1 mm.

A functionalized graphene oxide (fGO) is provided by introducing a uniform dispersion of $NH_2$-moieties with GO at a controlled $NH_2$-molarity, to provide a fGO with controlled physical adsorption and low energy desorption of $CO_2$. The fGO will be achieved by mixing specific amine chemistries to anchor with graphene or graphene oxide in large volume liquid suspensions. Specifically, graphite oxide dispersed in water is sonicated with N-Hydroxysuccinimide and 1-Ethyl-3-(3-dimethylaminopropyl) carbodiimide (Y. Liua, B. Sajjadib, W. Y. Chen, & R. Chatterjee, "Ultrasound-assisted amine functionalized graphene oxide for enhanced $CO_2$ adsorption", Fuel 247 (2019) pp. 10-18, the disclosure of which is incorporated by reference in its entirety) and mixed thoroughly. The GO will then be centrifuged out and rinsed with methanol and re-dispersed in methanol and ethylenediamine. The GO will then be centrifuged out, recovered and dried, and used to form pellets or coating. Adsorption can be evaluated using a thermogravimetric analysis as well as a packed bed reactor with a gas chromatograph/mass spectrometer at the outlet.

The end result is fGO having a primary or secondary amine on GO. A secondary amine structure is illustrated in FIG. 4. If R2 is H, the functional group is a primary amine.

A key in solid sorbent technology is the morphology and functionalization of graphene. The morphology in general should be high surface area, for example, twisted plane, number of graphene layers (fewer graphene layers correlating with a higher surface area per weight). Functionalization is predicated on the oxygen content of the graphene oxide. Also note that the mechanism for fGO's high carbon capacity is its high surface area, which affords multilayer adsorption and $CO_2$ cluster. In other solid sorbents, the mechanism of adsorption is due to size exclusion principles and thus their capacity is limited to monolayer adsorption and non-clustering (See G. M. Meconi and R. Zangi, "Adsorption-Induced Clustering of $CO_2$ on Graphene", Physical Chemistry Chemical Physics, August 2020, the disclosure of which is incorporated by reference in its entirety).

Figure 3:
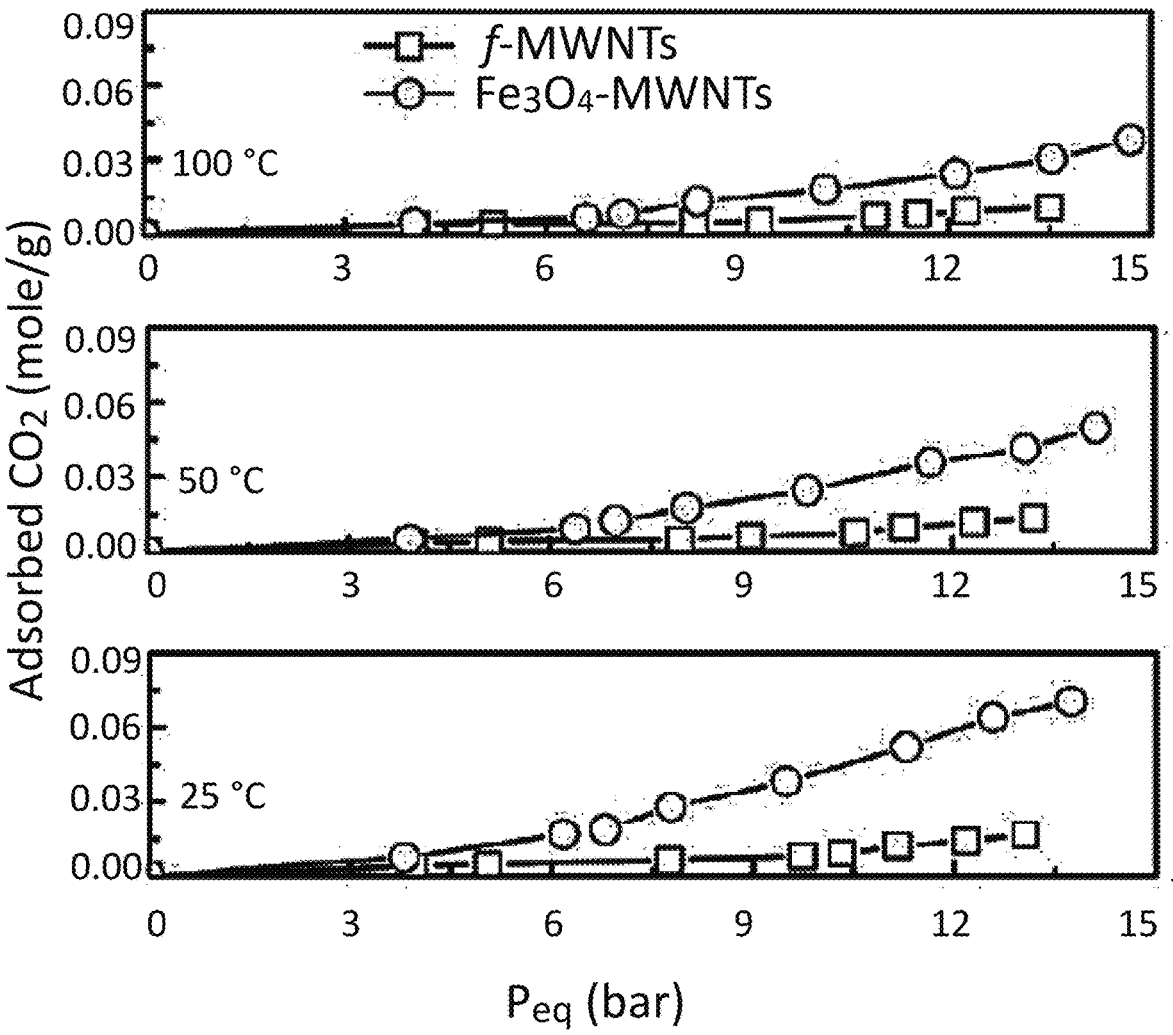
FIG. 3 illustrates the molar adsorption of $CO_2$ magnetite-($Fe_3O_4$) substituted on multi-walled carbon nanotubes.

In a preferred embodiment, a polyaniline-functionalized GO (PANI-fGO), as described in A. K. Mishra and S. Ramaprabhu, "Nanostructured polyaniline decorated graphene sheets for reversible $CO_2$ capture", J. Mater. Chem., 2012, 22, 3708, the disclosure of which is incorporated by reference in its entirety (hereinafter "Mishra") has a $CO_2$ sorption capacity that is ten times that of typical $CO_2$ sorbents, which are between 4-5 mmol $CO_2$/gm of sorbent at similar pressures, as shown in FIG. 2 (FIG. 4 of Mishra). The effective mechanism in PANI-fGO is multilayer sorption due to the planar geometry of GO. In standard sorbents, their mechanism of adsorption is size exclusion in a monolayer adsorption. In another embodiments, magnetite-($Fe_3O_4$) substituted on multi-walled carbon nanotubes (MWCNT) showed a similar 10× increase in adsorption over typical sorbents, as shown in FIG. 3 (FIG. 7 of Mishra).

Production of Functionalized Graphene Oxide:

There are several variants of fGO to maximize adsorption capacity and to minimize heat of desorption. They are 1) strength of the nucleophilic nitrogen in the amines, 2) length of the hydrocarbon chain to influence steric hindrance, and 3) the concentration of the carbonyl or hydroxyl groups (not the ether groups) on the GO. The first variant can be tuned by using primary) (1°, secondary) (2° or tertiary) (3° amines. The strongest interaction is with the primary amines.

The second variant, length of the hydrocarbon chain, also influences the strength of the electrophilic interaction from the carbon in $CO_2$ to the amines. A shorter hydrocarbon chain increases steric hindrance, decreases interaction, and decreases heat of adsorption.

The third variant, group concentration, addresses the specific capacity of $CO_2$ adsorption. More functional groups directly increase the adsorption capacity which can be varied and optimized through the level of oxidation of graphene oxide.

Figures 5D, 5E, 5F:
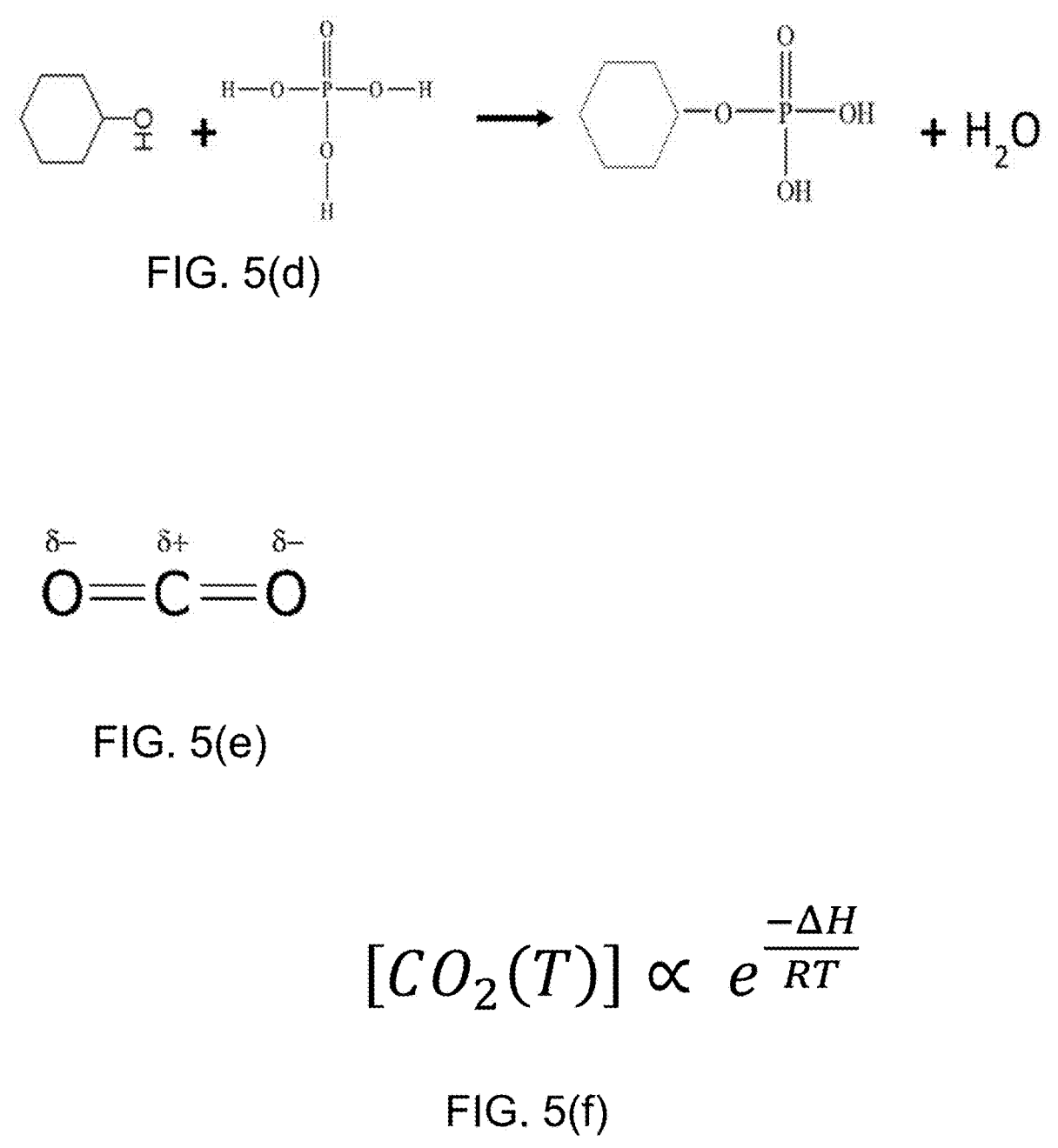

Using FIG. 1 to identify the individual molecular units, for example, benzene, ether, or carboxyl groups, of graphene oxide, one can conceive other nucleophilic groups attached to GO. For example, instead of amine groups, nitration is another pathway to add nucleophilic groups on the edges or on the basal plane. For example, a nitrate can be added to an aromatic ring via sulfuric acid to initiate an electrophile, illustrated in FIG. 5(*a*).

Similarly, a nitrile group can be added to the ketone functional group in GO, as illustrated in the reaction shown in FIG. 5(*b*).

In addition to the N (nucleophilic) of the amine groups, other elements in Groups 15 (Pnictogens) and 16 (Chalcogens) can serve as electron donors, and specifically phosphorus. Phosphorylation can treat the carbonyl groups on the GO to create phosphate functional groups. In Group 16, oxygen and sulfur can serve the function to donate electrons to the carbon in $CO_2$. The oxygen is already there in GO in forms of ether, hydroxyl or carbonyl groups.

Sulfur can be added to the GO via sulfonation, creating sulfate groups on the GO. Sulfonation is a common electrophilic aromatic substitution with $H_2SO_4$ (J. D. Roberts & M. C. Caserio, "Basic Principles of Organic Chemistry" 2nd Edition (1977), W. A. Benjamin, p. 1039), as shown in the reaction illustrated in FIG. 5(*c*)

To apply the concept to GO, GO powder is added into fuming sulfuric acid to introduce the sulfonate groups on the basal plane and the edges of GO.

Phosphorylation takes a different route. Since phosphoric acid is a weaker acid than sulfuric acid, it reacts with a hydroxyl group instead directly with a carbon-carbon bond, and proceeds as illustrated in the reaction shown in FIG. 5(*d*).

In GO, the phosphate groups will react with the hydroxyl groups on the basal plane of GO.

In summary, there are three pathways to functionalize GO that provide the strength of interaction, $\Delta H_{ads}$, and the location of the functional groups (edges or basal plane). The implication is that the adsorption capacity is much higher due to the interaction of the basal plane and the edges of fGO. In addition, there are clustering effects and multilayer adsorption of $CO_2$ on fGO further increase $CO_2$ adsorption by an order of magnitude over size exclusion-based sorbents. See FIGS. 2 and 3.

$CO_2$ Capture Mechanism

The carbon of $CO_2$ is electrophilic and has an electronic density as shown in the diagram shown in FIG. 5(*e*).

The functional groups named above are nucleophilic. The strength of interaction between the electrophilic carbon on the $CO_2$ molecule and the functional groups on the fGO is the first order effect in determining the selectivity and desorption energetics of carbon capture. Because $CO_2$ does not have a dipole, quadrupole interaction of the functional groups on GO and $CO_2$ is the second order effect.

Selectivity is a key attribute of the present invention as flue gases are a mixture of nitrogen gas ($N_2$), $CO_2$, carbon monoxide (CO), nitrous oxides (NOX), sulfurous oxides (SOx), and methane (CH$_4$). For diesel exhaust gases, following a SOx scrubber, the volumetric CO$_2$ concentration [CO$_2$] is about 7% and the volumetric moisture concentration [H$_2$O] is about 7%. The CO, NOx, SOx and H$_2$O molecules would normally compete against CO$_2$ for adsorption sites.

There are four approaches to selectively separate these two reactants: 1) design the sorbent to be hydrophobic; 2) install a column, prior to the carbon capture unit, to adsorb moisture of the flue gas; 3) introduce OH groups on GO to selectively interact with H$_2$O; or 4) leverage the reaction kinetics to favor CO$_2$ versus H$_2$O adsorption. Without being bound by any particular theory, it is believed that, on an adsorption versus time plot, CO$_2$ adsorbs faster than H$_2$O in the initial time phase. Over a longer time, H$_2$O displaces the bound CO$_2$ and achieves a higher amount of adsorption on a mass basis. The easiest pathways are the second or the third approaches. In the third approach, to introduce OH groups on GO to selectively interact with H$_2$O, after the initial time phase as the [CO$_2$]/[H$_2$O] threshold has been achieved, the column from adsorption to desorption, and the absorption column is never permitted to proceed to later phases where the H$_2$O would be permitted to displace the bound CO$_2$.
Regeneration.

The present invention also provides for regeneration of the CO$_2$-saturated fGO. The number of regeneration cycles is inversely proportional to the sorbent cost per capture cycle. Regeneration is based on optimizing the stability of the macro platelets of the GO, which is well-documented, with the degradation of functional groups over the thermal cycles. There are several standard thermomechanical industrial processes for regeneration-temperature swing, vacuum swing, or pressure swing. An optimal process will be based on the balance of the lowest capex and opex requirements at the requisite throughput.
Adsorption In various embodiments, a form for the fGO comprises pellets disposed in a packed bed process. The use of a pellet form in a packed bed can provide a higher throughput through the packed beds, as commonly used in large scale catalytic chemical synthesis. The fGO powders are extruded, with binders such as hydroxypropyl cellulose, into 1-mm diameter cylinders. The pellet form is preferred to minimize dusting in operations.

In preferred embodiments of the adsorption process, the flue gas is conditioned before passing through the packed bed. In various embodiments, the flue gas is cooled from a typically flue gas outlet temperature to an adsorb inlet temperature of about 40-80° C. The preferred temperature is toward the low end of the range to increase adsorption capacity of the fGO for CO$_2$, which is a trade off with additional energy needed to cool the flue gas, typically being the result of combusted fuel, to the required low adsorption temperature.

Typically, a fresh sorbent is a cylindrical pellet formed with a binder comprising hydroxyethyl cellulose and having a 1 mm diameter and a 5 mm length. The void fraction (porosity), $¿$, of the packed bed of sorbent is typically about 40%. A typical size of the bed column is 1 meter in diameter and 10 meters tall, with a superficial gas velocity of about 1 meter/sec. The outlet pressure is atmospheric.
Desorption One or more of several process parameters can be used to rapidly regenerate the sorbent, which can include temperature change, temperature and vacuum changes, temperature and moisture changes, and electrical current changes. In general, energy is applied to dislodge a sorbate from the sorbent. The energies are in the form of heat (high temperature), mechanical (pressure or vacuum) or electrical current. The latter is not applicable to our process as it is not energy efficient in a gas-phase desorption process.

It is well known that sorbate-sorbent interaction follows the Arrhenius equation (R. Nix, "Kinetics of Adsorption", Ch.2.3, LibreText Chemistry, 2023) shown in FIG. 5(f).

where $\Delta H$ is the exothermic heat of adsorption. As temperature increases, the concentration of CO$_2$ decreases on the sorbent. Hence, the first stage of desorption is through the application of heat. In various embodiments, an operating temperature during desorption is about 110° C., which is compatible with the temperature of waste heat generated in industrial sites. In some embodiments, the desorption is performed at 80° C. to desorb CO$_2$ sufficiently. A second stage, via vacuum or pressure, is to extract a portion of CO$_2$ remaining on the sorbent. In some embodiments, a vacuum pressure of about 0.1 bar is used during desorption of the remaining CO$_2$ from the fGO sorbent.

The invention claimed is:

1. A method for capturing selectively carbon dioxide from a flue stream, the method comprising the steps of:
   a. providing a functionalized carbon dioxide sorbent that comprises a functionalized graphene oxide substrate having a plurality of substitution sites substituted with a plurality of functional groups, wherein the plurality of functional groups include (i) at least one of a primary amine and a secondary amine, and (ii) a tertiary amine;
   b. passing a flue gas containing moisture and a concentration of carbon dioxide (CO$_2$) across the sorbent; and
   c. adsorbing selectively a portion of CO$_2$ in the flue gas onto the fGO of the sorbent to reduce the concentration of the CO$_2$ content of the flue gas, and generating a partially-saturated sorbent comprising adsorbed CO$_2$.

2. The method according to claim 1 wherein the flue gas containing a concentration of carbon dioxide (CO$_2$) is introduced into the packed bed of the sorbent at a temperature of about 40-80° C.

3. The method according to claim 2 wherein the temperature of the fluid exposed to the partially-saturated sorbent is about 70-125° C. to at least partially desorb CO$_2$ from the partially-saturated sorbent.

4. The method according to claim 3, further including a step of exposing the partially-desorbed sorbent to a vacuum of about 0.1 bar or less to extract a further portion of CO$_2$ remaining on the sorbent.

5. The method according to claim 1 wherein the sorbent is in the form of a pellet.

6. The method according to claim 5 wherein the sorbent pellet comprises a binder intermixed with the functionalized graphene substrate.

7. The method of claim 1, for releasing the captured carbon dioxide, further including the steps of:
   d. exposing the partially-saturated sorbent to a fluid at conditions of temperature and pressure sufficient, to desorb the adsorbed CO$_2$ from the partially-saturated sorbent into the fluid; and
   e. separating and concentrating the desorbed CO$_2$ from the fluid.

8. The method according to claim 1 wherein the plurality of functional groups further include one or more of a phosphate, a sulfonate, a nitrile, a hydroxyl, and magnetite.

9. The method according to claim 1 wherein the weight range of oxygen in the graphene oxide is from 5% to 50%.

10. A method for capturing selectively carbon dioxide from a flue stream, the method comprising the steps of:

a. providing a packed bed of a functionalized carbon dioxide sorbent that comprises a functionalized graphene oxide (fGO) substrate having a plurality of substitution sites substituted with a plurality of functional groups, wherein the plurality of functional groups include (i) at least one of a primary amine and a secondary amine, and (ii) a tertiary amine;

b. passing a flue gas containing moisture and a concentration of carbon dioxide ($CO_2$) across the sorbent; and c. adsorbing selectively a portion of $CO_2$ in the flue gas onto the fGO of the sorbent to reduce the concentration of the $CO_2$ content of the flue gas, and generating a partially-saturated sorbent comprising adsorbed $CO_2$.

11. The method according to claim 10 wherein the plurality of functional groups further include one or more of a phosphate, a sulfonate, a nitrile, a hydroxyl, and magnetite.

12. The method according to claim 11 wherein the flue gas containing a concentration of carbon dioxide ($CO_2$) is introduced into the packed bed of the sorbent at a temperature of about 40-80° C.

13. The method according to claim 12 wherein the temperature of the fluid exposed to the partially-saturated sor-bent is about 70-125° C. to at least partially desorb $CO_2$ from the partially-saturated sorbent.

14. The method according to claim 13, further including a step of exposing the partially-desorbed sorbent to a vacuum of about 0.1 bar or less to extract a further portion of $CO_2$ remaining on the sorbent.

15. The method according to claim 10 wherein the sorbent is in the form of a pellet.

16. The method according to claim 15 wherein the sorbent pellet comprises a binder intermixed with the functionalized graphene substrate.

17. The method of claim 10, for releasing the captured carbon dioxide, further including the steps of:

d. exposing the partially-saturated sorbent to a fluid at conditions of temperature and pressure sufficient, to desorb the adsorbed $CO_2$ from the partially-saturated sorbent into the fluid; and e. separating and concentrating the desorbed $CO_2$ from the fluid.

18. The method according to claim 10 wherein the weight range of oxygen in the graphene oxide is from 5% to 50%.

* * * * *